(12) United States Patent
Mace

(10) Patent No.: US 7,769,936 B2
(45) Date of Patent: Aug. 3, 2010

(54) DATA PROCESSING APPARATUS AND METHOD FOR ARBITRATING BETWEEN MESSAGES ROUTED OVER A COMMUNICATION CHANNEL

(75) Inventor: Timothy Charles Mace, Haverhill (GB)

(73) Assignee: ARM Limited, Cambridge (GB)

( * ) Notice: Subject to any disclaimer, the term of this patent is extended or adjusted under 35 U.S.C. 154(b) by 64 days.

(21) Appl. No.: 12/073,403

(22) Filed: Mar. 5, 2008

(65) Prior Publication Data

US 2008/0235423 A1 Sep. 25, 2008

(30) Foreign Application Priority Data

Mar. 22, 2007 (GB) ................................ 0705519.7

(51) Int. Cl.
*G06F 13/36* (2006.01)
*G06F 13/362* (2006.01)

(52) U.S. Cl. .................... 710/113; 710/116; 710/118

(58) Field of Classification Search ................ 710/113, 710/116, 118
See application file for complete search history.

(56) References Cited

U.S. PATENT DOCUMENTS

| 5,802,330 | A  | * | 9/1998 | Dutton ....................... 710/116 |
| 5,956,493 | A  |   | 9/1999 | Hewitt et al. |
| 6,006,303 | A  |   | 12/1999 | Barnaby et al. |
| 7,227,847 | B2 | * | 6/2007 | Gluck ........................ 370/311 |
| 2007/0038792 | A1 |   | 2/2007 | Shin |

FOREIGN PATENT DOCUMENTS

| EP | 0 444 395 A3 | 9/1991 |
| EP | 1 170 669 A1 | 1/2002 |
| EP | 1170669 A1 * | 1/2002 |

OTHER PUBLICATIONS

Search Report for Great Britain Patent Application No. 0705519.7 dated Jun. 21, 2007.

* cited by examiner

*Primary Examiner*—Mark Rinehart
*Assistant Examiner*—Jeremy S Cerullo
(74) *Attorney, Agent, or Firm*—Nixon & Vanderhye P.C.

(57) ABSTRACT

A data processing apparatus and method are provided for arbitrating between messages routed over a communication channel. The data processing apparatus has a plurality of processing elements, each processing element executing a process requiring messages to be issued to recipient elements, and a communication channel shared amongst those processing elements over which the messages are routed. Arbitration circuitry performs an arbitration process to arbitrate between multiple messages routed over the communication channel. Each processing element issues progress data for the process executing on that processing element, the progress data indicating latency implications for the process. Arbitration control circuitry is then responsive to the progress data from each processing element to perform a priority ordering process taking into account the latency implications of each process as indicated by the progress data in order to generate priority ordering data. That priority ordering data is then output to the arbitration circuitry in order to control the arbitration process. This enables quality of service to be determined and allocated automatically between the various processes, without the need to know the requirements of the processes in advance, and the prioritization mechanism adapts dynamically to changes in communication between the processes.

20 Claims, 11 Drawing Sheets

DATA PROCESSING APPARATUS AND METHOD FOR ARBITRATING BETWEEN MESSAGES ROUTED OVER A COMMUNICATION CHANNEL

TECHNICAL FIELD

The technology described herein relates to a data processing apparatus and method for arbitrating between messages routed over a communication channel, and in particular, for arbitrating between messages routed over a communication channel shared amongst a plurality of processing elements.

BACKGROUND

There are many systems where a communication channel is shared amongst a plurality of processing elements, with the various processing elements issuing messages over the communication channel to recipient elements. The communication channel may take the form of bus interconnect circuitry used to connect a number of master devices with a number of slave devices within a chip such as a System-on-Chip (SoC) device, or to connect individual chips in a multi-chip module, or indeed to interconnect various modules within a printed circuit board structure. On a larger scale, the communication channel may be formed by a network interconnecting a plurality of computers, or a shared radio link used to interconnect a plurality of devices.

For any communication channel, there is a limit to the information carrying capacity of that channel, and there is also a latency associated with the communication channel. There are architectural options which enable the channel capacity and latency to be varied, such as the use of parallelisation techniques and increased operating frequency. However, such techniques have a cost in complexity, power and area which need to be traded against the required performance.

In any system where a communication channel is shared amongst a plurality of processing elements, with those processing elements needing to issue messages over the communication channel when executing a process, the fact that the communication channel is shared forces decisions to be made regarding the order in which the messages are processed through the communication channel, and this decision is made by employing arbitration techniques. Considering the example of a SoC, the messages may take the form of signals issued by a master device during a transaction, and in particular the master device will typically initiate a transaction by issuing an access request onto the communication channel specifying a slave device associated with the transaction. It is known in this particular field that certain ordering of transactions will result in a lower total latency than other orderings, and this is an area where devices such as memory controllers often specialise. However, the arbitration decision will necessarily add to the latency experienced by the process whose message has been held back as a result of the arbitration decision. Accordingly, the way in which this arbitration decision is made will have a significant effect on the overall performance of the system.

Basic arbitration schemes use algorithms that employ fixed priority or round robin (fair share) techniques. Such schemes are limited to making the arbitration decision on a message-by-message basis and take limited account of choices made in the past. The exception with the round robin scheme is that the current priority depends on the previous priorities. However, both schemes suffer from the problem that they allocate the additional latency introduced through the communication channel on a message-by-message basis rather than between the individual processes issuing the messages. Consequently, a message that has high levels of access through the communication channel will receive high levels of additional latency over time as a result of the arbitration decisions made within the communication channel.

An alternative technique which has been developed primarily for networks is the Quality-of-Service (QoS) technique, which takes a time based view by attempting to ensure that a process has a required bandwidth and controlled latency characteristics. Hence, such QoS schemes consider each process and allocate a proportion of the bandwidth of the communication channel to that process with some control over the latency applied to each transaction or message. However, the limitation with known QoS schemes is that the characteristics of each process are assumed to be known prior to the actual data flow occurring when those processes are executed, and also require some higher level protocol to manage that information. Hence, such QoS schemes are inflexible to changes in the bandwidth or latency characteristics, require the characteristics to be known in advance, and require a higher level protocol to configure the operation of the communication channel to provide the necessary characteristics to the processes. Hence, existing QoS schemes start from the assumption that the communication channel offers performance, and allocate this performance according to predefined requirements from the processes. This can lead to processes that have lower bandwidth requirements than anticipated getting an unfair performance, while other processes that exceed their predefined characteristics are starved of performance.

Whilst some of these known QoS schemes can work acceptably within a network environment, in other types of systems, for example a SoC, the data flows occurring through the shared communication channel can be random (e.g. resulting from cache misses and the like) and dynamically variable, and thus as such are not suitable for existing QoS schemes.

Accordingly, it would be desirable to provide an improved technique for arbitrating between messages routed over a shared communication channel.

SUMMARY

Viewed from a first aspect, the technology described herein provides a data processing apparatus for arbitrating between messages routed over a communication channel, comprising: a plurality of processing elements, each processing element for executing a process requiring messages to be issued to recipient elements; a communication channel shared amongst the plurality of processing elements over which the messages are routed; arbitration circuitry for performing an arbitration process to arbitrate between multiple messages routed over the communication channel; each processing element being arranged to issue progress data for the process executing on that processing element, the progress data indicating latency implications for the process; and arbitration control circuitry, responsive to the progress data from each processing element, to perform a priority ordering process taking into account the latency implications of each process as indicated by the progress data in order to generate priority ordering data, and to output the priority ordering data to the arbitration circuitry in order to control the arbitration process.

Each processing element is arranged to issue progress data for the process executing on that processing element, with the progress data indicating latency implications for the process. Ultimately, when latency increases to a particular level, it will cause a process to stall, but this may not occur immediately as there may be sufficient buffering or other computations that can be executed first. Further, the impact of a stall to a process will vary dependent on that process, and in some instances may be catastrophic, whilst for other processes the impact of a stall may be less critical, and may merely extend the time that that process takes to complete. Hence, it will be appreciated that the implications of latency will vary dependent on the process, and accordingly the progress data issued in respect of each executing process indicates the latency implications specific to that process.

Further, arbitration control circuitry is provided which is responsive to the progress data from each processing element to perform a priority ordering process taking into account the latency implications indicated by the progress data. As a result of this process, priority ordering data is generated, and this priority ordering data is output to arbitration circuitry provided by the data processing apparatus in order to control the arbitration process performed by that arbitration circuitry.

The placement of the arbitration circuitry will depend on the structure of the communication channel. Typically there will be multiple points within the communication channel where arbitration needs to be performed, and accordingly the arbitration circuitry will be distributed throughout the communication channel so as to enable arbitration to be performed at each of those points. At each such point, the priority ordering data output by the arbitration control circuitry will be used to arbitrate between multiple messages appearing at that point in the communication channel.

Through use of the technology described herein, arbitration can be performed taking into account requirements of individual processes, and hence adopting a QoS style of arbitration, but in contrast to known QoS schemes, the QoS is determined and allocated automatically between the processes hence removing the need to know the requirements in advance. Further, the QoS mechanism adapts dynamically to changes in communication between the processes. In particular, as the progress data from individual processes changes, this will influence the priority ordering data produced by the arbitration control circuitry, which in turn will influence the arbitration performed by the arbitration circuitry of the data processing apparatus.

The processing elements sharing the communication channel can take a variety of forms. However, in one embodiment, each processing element is a master device connected to the communication channel. Typically, the recipient elements to which the messages are issued over the communication channel will be slave devices, and individual transactions will be issued by a master device when executing a process thereon in order to cause a number of read or write transfers to take place between the master device and a selected slave device via the communication channel. In such embodiments, each message may take the form of an access request issued by one of the master devices to initiate a transaction. However, the exact form of the message will depend on the protocol being used on the communication channel. For a bus protocol such as the AXI (Advanced eXtensible Interface) protocol developed by ARM Limited, Cambridge, United Kingdom, the read and write data form part of the message described in the address transfer specified by a transaction, whilst in a packetised system the request and data could form part of a single packet constituting the message.

The individual processes executed by the various processing elements can take a variety of forms. However, in one embodiment, each process is a program thread, and each processing element executes a single program thread. In such embodiments, the progress data is provided on a thread-by-thread basis.

In an alternative embodiment, at least one processing element comprises multiple processing units, with each processing unit executing a program thread. In this embodiment, the processing element is a multi-core processor and the "process" for which the progress data is issued consists of all the various program threads executing on the various processing units of that processing element. Another way of configuring such a multi-core processor is to arrange each of the individual processing units within the multi-core processor to be individually considered as processing elements, so that each processing unit within the multi-core processor outputs its own progress data relating to the program thread executing on that processing unit.

The data processing apparatus can take a variety of forms, but in one embodiment takes the form of a SoC. The techniques of the technology described herein are particularly beneficial in a SoC apparatus, since the various data flows occurring through the communication channel can be random and dynamically variable. The techniques are flexible enough to manage the bandwidth and latency of the various processes as their requirements vary.

The progress data can take a variety of forms. In one embodiment, the progress data identifies whether the associated process is a real time process or a non real time process, for a real time process the progress data additionally identifying at least a slack value indicating a time remaining for handling of a message issued by that real time process, for a non real time process the progress data additionally identifying at least a latency value indicating latency associated with that process over a predetermined time.

For the purposes of the present description, a real time process can be considered to be any process where the impact of a stall to that process is considered to be catastrophic, and accordingly unacceptable. An example may be a process that is generating video for display on a screen, where a disruption in the video displayed may be considered unacceptable. In contrast, a non-real time process in the context of the present application means any process where a stall can be accepted, and hence the impact of a stall is less critical and results in an extension of the time that the process takes to complete. In addition to an indication as to whether the process is a real time process or a non real time process, for a real time process the progress data additionally identifies a slack value indicating the time left for handling a message issued by that real time process (i.e. how long there is before the process will stall). In contrast, for a non real time process, the progress data additionally identifies at least a latency value indicating latency associated with that process over a predetermined time. The predetermined time is a design parameter that can be varied depending on the implementation. The longer the predetermined time, then the larger the amount of historical information taken into account when producing the latency value, whereas the shorter the predetermined time, then the quicker the latency value will change in response to recent changes, and hence the more quickly the priority ordering data generated by the arbitration control circuitry will adapt to recent changes in demand from a particular process.

By incorporating the above information within the progress data, the arbitration control circuitry can ensure that real time processes are prioritised sufficiently to ensure that they will not stall, but where the slack value associated with a real time process allows, a non real time process can be prioritised ahead of a real time process with the aim of reducing the latency experienced by that non real time process. By arranging the latency value identified for each non real time process to indicate latency associated with that process over a predetermined time, this enables the overall latency to be allocated fairly between the non real time processes.

The circuitry provided to produce the latency values associated with each non real time process can take a variety of forms. For example, for each process, a signed binary value can be maintained where negative values indicate latency that can be added without stalling the process and positive values count latency already added to the process. On every cycle where latency is added to a transfer, this binary counter can be incremented, and when the binary value is positive, this indicates that the thread has stalled. This stall time can then be accumulated in an integrator (since the integrator value becomes unlimited over time, a mechanism could be provided to subtract a value from all integrators periodically). The latency value output by the integrator hence provides information on the difference in stall time between the threads which can be used by the arbitration control circuitry when generating the priority ordering data. As an alternative to using an integrator, filter circuitry can be associated with each processing element executing a non real time process, with the filter circuitry producing the latency value in the form of latency per unit time. Hence, in such embodiments, a simple low-pass filter can be used to track the accumulated stall time and the output from each filter is proportional to the average stall rate, i.e. the number of cycles during which the thread is stalled over the predetermined time forming a reference period.

In one embodiment, all non real time processes could be treated equally, with the latency values contained in the progress data being used to seek to share out the effects of latency evenly amongst the non real time processes. However, in an alternative embodiment, at least one non real time process has a weighting associated therewith and that weighting is taken into account when producing the latency value for that non real time process. The weighting for each such process could be fixed at design time, or could be programmable, but typically will not be dynamically varied. In embodiments employing the filter circuitry, the weighting of each non real time process can be implemented by applying different weightings to the filter algorithms applied by such filter circuitry. Accordingly, a high weighting could be applied to certain non real time processes whilst a lower weighting is applied to other non real time processes, so that when the priority ordering process is being performed by the arbitration control circuitry, certain non real time processes (i.e. the ones with the higher weighting) can be favoured over other non real time processes. As an example, this may allow a process that generates an audio stream to be considered as a non-real time process if it is acceptable for the audio to be disrupted very occasionally as a result of stalling of that process, but for a high weighting to then be applied in respect of that process, so that the latency values output in respect of that process increase relatively quickly when compared with other less important non real time processes, thus causing that audio stream process to be prioritised ahead of the lower priority non real time processes when performing the priority ordering process within the arbitration control circuitry.

In one embodiment, the data processing apparatus further comprises counter circuitry associated with each processing element executing a real time process, the counter circuitry producing said slack value. Hence, in one embodiment the counter circuitry may set a counter to a particular value when a message is issued by that process (e.g. a transaction starts), with that counter value then being decremented each clock cycle such that over time the slack value reduces. While the slack value is relatively high, the priority ordering process performed by the arbitration control circuitry may prioritise certain non real time processes ahead of the real time process, but there will become a point where the slack value reduces to a level such that the priority ordering process then prioritises the real time process ahead of such non real time processes.

In one embodiment, for a non real time process the progress data additionally identifies a stall value identifying whether that process is stalled or not. In one particular embodiment, this can take the form of a single bit value where one value indicates that the process is stalled and the other value indicates that it is not stalled. In one particular embodiment, this stall value can also be used as the input to the filter circuitry used to produce the latency value.

In one embodiment, for a non real time process the progress data additionally identifies a slack value indicating a time remaining for handling of a message issued by that process before the process will stall. Hence, in situations where the non real time process initiates transactions ahead of time (i.e. the process is still able to continue for a certain period before the result of that transaction is required), a slack value can be included within the progress data identifying the time remaining before the process will stall, and this information can be taken into account by the arbitration control circuitry when performing the priority ordering process.

The priority ordering process can be arranged in a variety of ways. However, in one embodiment the priority ordering process gives priority to a non real time process over a real time process if the slack value of that real time process indicates that the time remaining for handling of a message issued by that real time process is larger than a predetermined threshold. Hence, when the slack in a real time process allows, non real time processes can be prioritised ahead of the real time process to reduce the latency experienced by those non real time processes, and without having any actual impact on the real time process.

In one embodiment, the priority ordering process gives priority to a non real time process with a higher latency value over a non real time process with a lower latency value. Since these latency values indicate latency associated with the processes over a predetermined time, this enables a fair apportionment of the latency across the non real time processes.

In one embodiment, for two non real time processes having different stall values, the priority ordering process gives priority to the non real time process whose stall value indicates that that process is stalled in preference to giving priority to the process with the higher latency value. Hence, such an approach seeks to reduce the time that any non real time process is stalled.

In one embodiment, for two non real time processes having different slack values, the priority ordering process gives priority to the non real time process with the least slack in preference to giving priority to the process with the higher latency value. Such an approach seeks to reduce the likelihood of non real time processes stalling where possible.

Whilst the main aim of the progress data produced by each processing element is to enable quality of service considerations to be taken into account by arbitration control circuitry when performing the priority ordering process, it has also been found that certain of the progress data can be reused in other parts of the data processing apparatus. For example, it is known to provide a data processing apparatus with energy management circuitry to control the performance levels at which the various components of the apparatus operate. Such a data processing apparatus can typically switch between different operating performance levels at run-time. Lower performance levels are selected when running light workloads to save energy (power consumption) whereas higher performance levels are selected for more processing-intensive workloads. Typically, when the processing elements within the data processing apparatus are implemented in a complimentary metal-oxide semiconductor (CMOS) technology, lower performance levels imply lower frequency and operating voltage settings.

In one embodiment where the data processing apparatus includes such energy management circuitry, the energy management circuitry is arranged to take into account at least part of the progress data issued by one or more processing elements when determining the operating performance level for those processing elements. In one particular embodiment, the energy management circuitry takes into account the latency values output by one or more processing elements executing a non real time process.

Viewed from a second aspect, the technology described herein provides a method of arbitrating between messages routed over a communication channel of a data processing apparatus having a plurality of processing elements, each processing element executing a process requiring messages to be issued to recipient elements, and the communication channel being shared amongst the plurality of processing elements over which the messages are routed, the method comprising: issuing from each processing element progress data for the process executing on that processing element, the progress data indicating latency implications for the process; responsive to the progress data from each processing element, performing a priority ordering process taking into account the latency implications of each process as indicated by the progress data in order to generate priority ordering data; and performing an arbitration process to arbitrate between multiple messages routed over the communication channel, the priority ordering data being used to control the arbitration process.

Viewed from a third aspect, the technology described herein provides arbitration control circuitry for a data processing apparatus, the data processing apparatus having a plurality of processing elements, each processing element executing a process requiring messages to be issued to recipient elements, a communication channel shared amongst the plurality of processing elements over which the messages are routed, and arbitration circuitry for performing an arbitration process to arbitrate between multiple messages routed over the communication channel, the arbitration circuitry comprising: an input interface for receiving from each processing element progress data for the process executing on that processing element, the progress data indicating latency implications for the process; priority ordering circuitry, responsive to the progress data from each processing element, to perform a priority ordering process taking into account the latency implications of each process as indicated by the progress data in order to generate priority ordering data; and an output interface for outputting the priority ordering data to the arbitration circuitry in order to control the arbitration process.

DESCRIPTION OF EXAMPLE EMBODIMENTS

Figure 1:
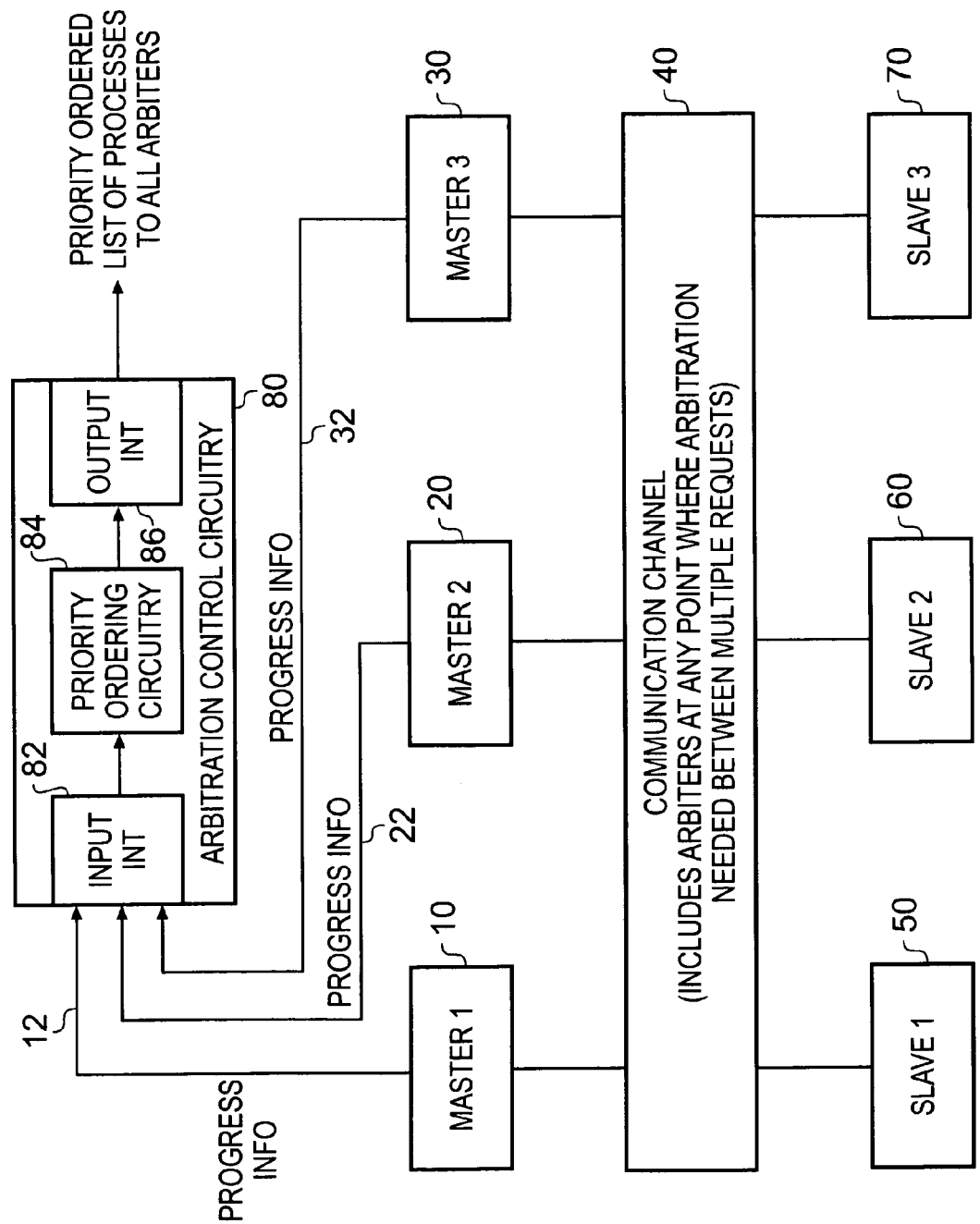
FIG. 1 is a block diagram of a data processing apparatus in accordance with one example embodiment.

FIG. 1 is a block diagram of a data processing apparatus in accordance with one example embodiment. In this embodiment, the data processing apparatus takes the form of a SoC comprising a number of master devices 10, 20, 30 coupled via communication channel 40 with a number of slave devices 50, 60, 70. Whilst for the purposes of discussing an example embodiment, such a SoC device will be considered, it will be appreciated by those skilled in the art that the techniques of example embodiments may be applied to a wide variety of different systems where a communication channel is shared amongst a plurality of processing elements.

Considering the SoC example of FIG. 1, the communication channel 40 will typically take the form of an interconnect block comprising a number of interconnected buses providing a matrix of connections for the interconnection of the multiple bus master devices 10, 20, 30 and bus slave devices 50, 60, 70 within the SoC.

The buses forming the communication channel will typically operate in accordance with a specified bus protocol, and hence for example may operate in accordance with the "Advanced Microcontroller Bus Architecture" (AMBA) specification developed by ARM Limited.

Accordingly, it will be appreciated that the communication channel 40 consists of a complex arrangement of interconnections between various master and slave devices. At various points within the communication channel, it will be necessary to provide arbitration circuitry to arbitrate between multiple messages contending for use of a particular path.

Each of the masters 10, 20, 30 will typically execute a process during which various transactions will be initiated over the communication channel 40. Such transactions enable data to be routed from a master to a slave (in the event of a write transaction) or from a slave to a master (in the event of a read transaction), with each transaction being initiated by a master device issuing an access request onto the communication channel. Each access request can be considered to form a message, and arbitration circuitry within the communication channel will need to perform arbitration at any points within the bus infrastructure where multiple messages may contend for use of a particular path.

Accordingly, the arbitration circuitry can be considered to consist of a plurality of arbitration elements dispersed throughout the communication channel, with each such arbitration element performing an arbitration process to arbitrate between multiple messages. In accordance with example embodiments, the arbitration process performed by each arbitration element is determined by arbitration control circuitry 80 which is arranged to receive at an input interface 82 progress information output by each master device 10, 20, 30 over corresponding paths 12, 22, 32, respectively. As will be described in more detail later, this progress data indicates latency implications for the process running on each master device, and that progress data is forwarded to priority ordering circuitry 84 within the arbitration control circuitry where a priority ordering process is performed taking account of that progress data in order to generate priority ordering data. That priority ordering data is then output via the output interface 86 as a priority ordered list of processes, with that list being routed to all arbitration elements (also referred to herein as arbiters) within the communication channel. There are a variety of ways in which this priority ordered list could be disseminated. In one embodiment, it may be disseminated over the same paths as are used to route the messages, whilst in an alternative embodiment this ordered list could be disseminated by a separate dedicated bus structure. Each arbiter then performs its arbitration process based on the priority order list provided.

The arbitration control circuitry 80 can be arranged to update this priority ordered list at predetermined intervals. Generally speaking the priority ordered list should be updated whenever any input to the arbitration control circuitry changes. Typically, this will result in the list being updated each clock cycle, unless there are few or no transactions in progress.

Figure 2A:
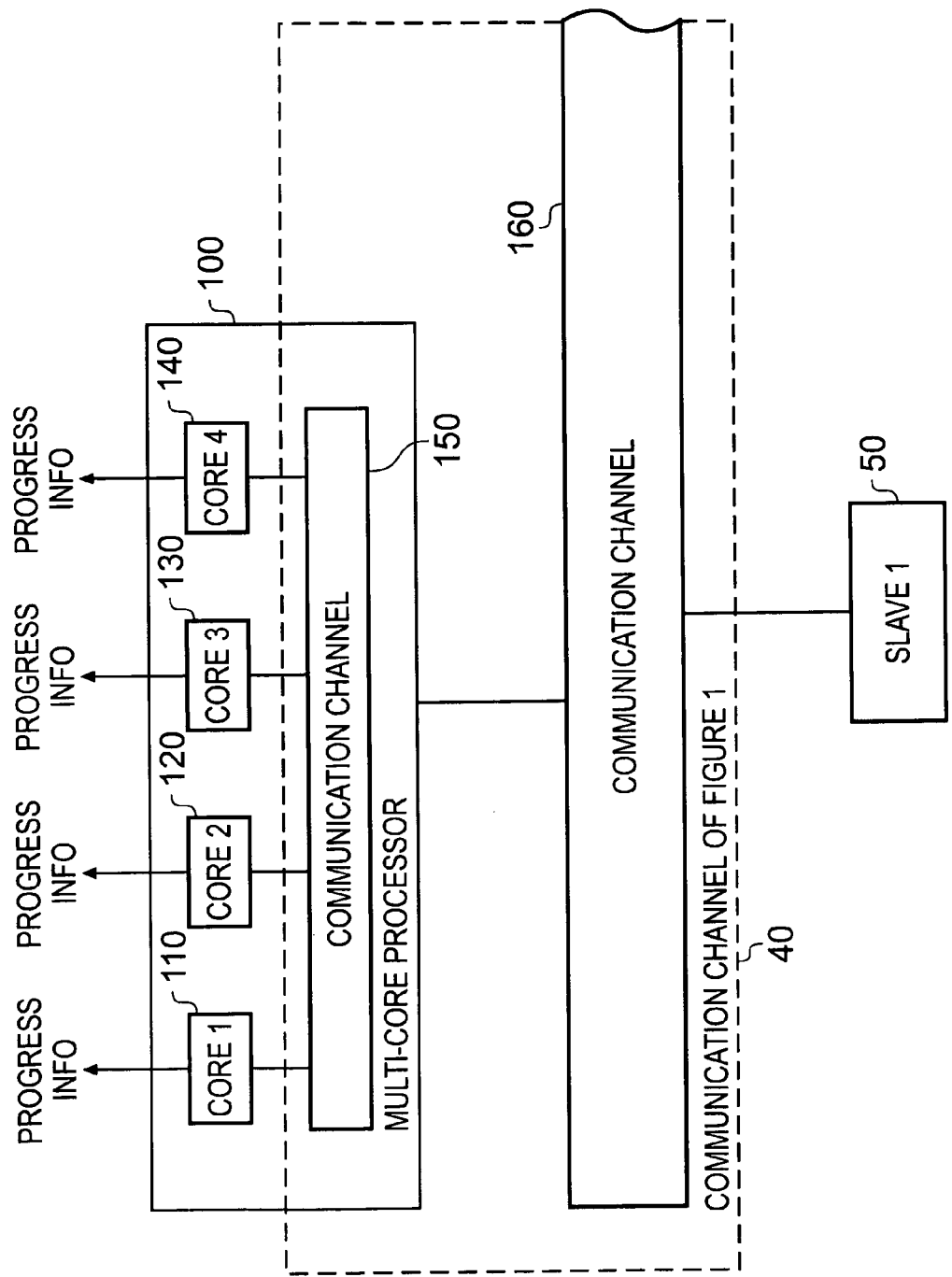
FIG. 2A is a block diagram illustrating one approach for accommodating a multi-core processor within the data processing apparatus of FIG. 1.

FIG. 2A is a block diagram illustrating one way in which a multi-core processor 100 can be accommodated within the data processing apparatus of FIG. 1. The multi-core processor 100 has a plurality of processor cores 110, 120, 130, 140 which are interconnected via an internal communication channel 150 within the processor 100. The multi-core processor 100 is then connected to an external communication channel 160 via which it can communicate with the various slave devices 50, 60, 70. In one embodiment, the communication channel 40 of FIG. 1 can be considered to encompass both the internal communication channel 150 of the multi-core processor 100 and the communication channel 160 external to the multi-core processor, so that in effect each of the processor cores 110, 120, 130, 140 can be considered to form separate master devices each of which issue their own progress information to the arbitration control circuitry 80. In one embodiment, each such core 110, 120, 130, 140 executes a separate program thread, and accordingly the progress information output from any particular core indicates latency implications for the associated thread.

Figure 2B:
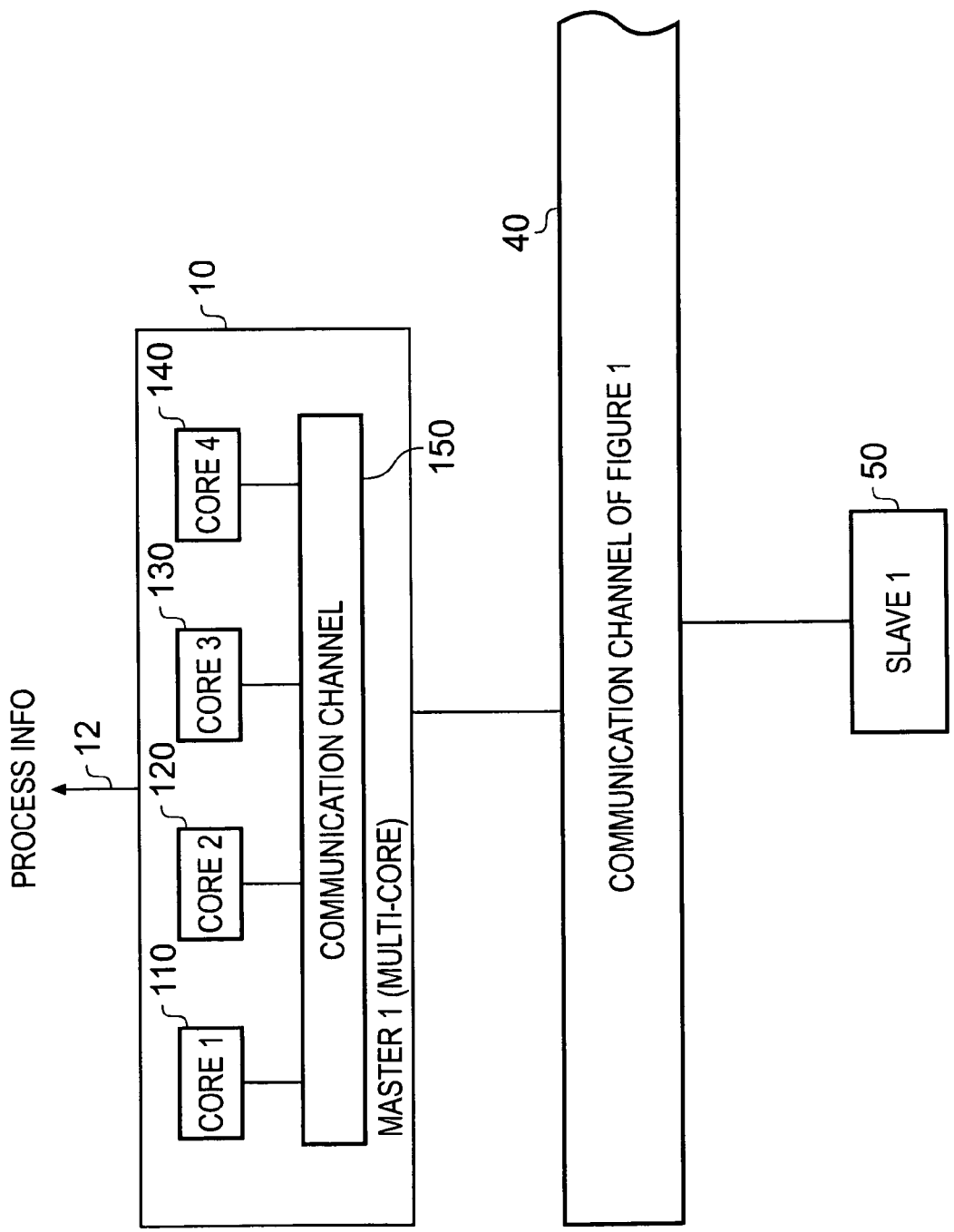
FIG. 2B is a block diagram showing an alternative way of accommodating a multi-core processor within the data processing apparatus of FIG. 1.

In an alternative embodiment, as illustrated in FIG. 2B, the internals of the multi-core processor may be hidden from the arbitration control circuitry and instead the entirety of the multi-core processor is viewed as a single master device, in this example master device 10. Accordingly, the progress information output over the path 12 to the arbitration control circuitry in situations where the master device 10 is a multi-core processor provides latency implications for the "process" performed by the multi-core processor as a whole, and hence does not directly provide latency implications for each individual thread executed by each individual core 110, 120, 130, 140.

Figure 3A:
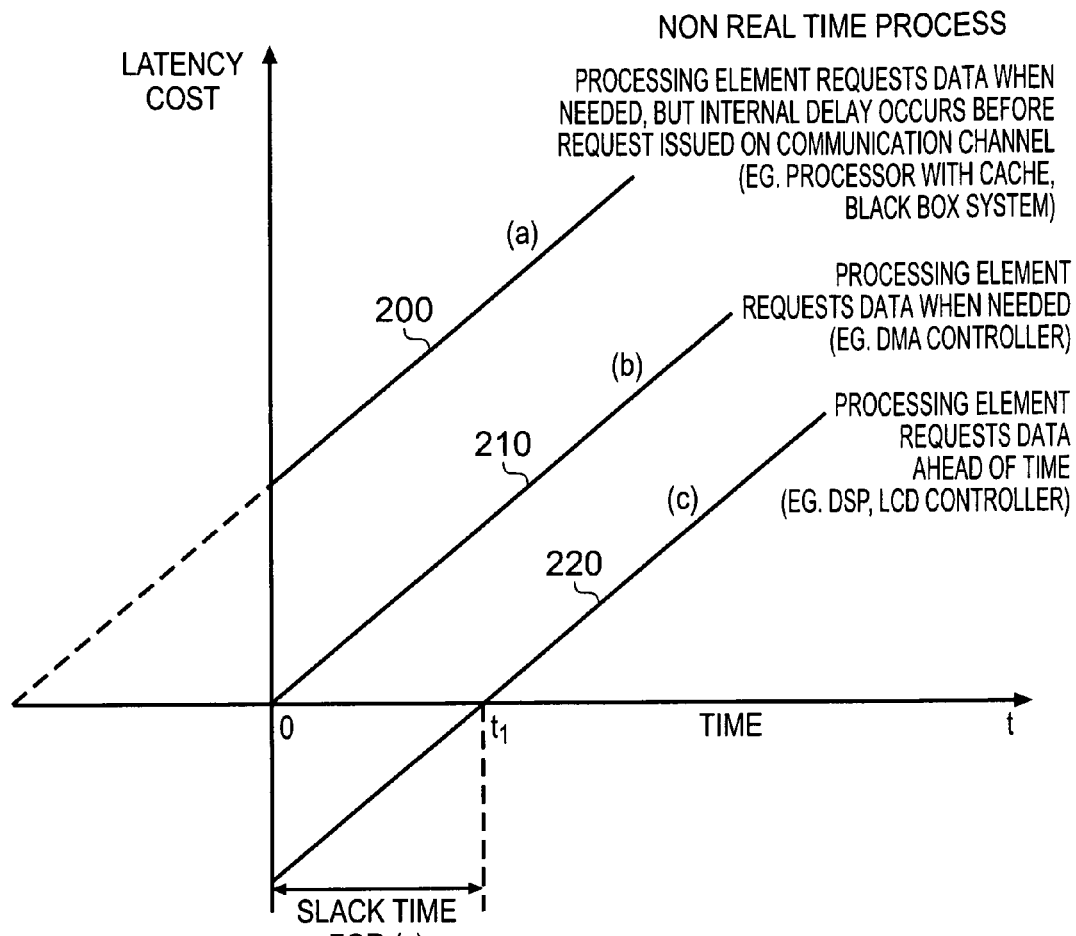
FIG. 3A is a chart schematically illustrating latency cost against time for different types of non real time process.

FIG. 3A is a chart illustrating the latency cost against time for various types of non real time process. Line "a" 200 illustrates the form of latency cost occurring when a processing element runs a process that requests data when it is needed, but internal delay occurs before any access request is issued over the communication channel 40. This for example may be the case where the master device is a processor with an internal cache, a black box system, etc. Considering the processor with cache example, when the access request is issued by the processor, a lookup will first be performed in the cache to determine whether the data the subject of the access request is in the cache. If not, a cache miss will occur, and the access request will then appear over the communication channel 40. As indicated by the dotted line in FIG. 3A in association with line 200, the latency observed by the non real time process is already increasing before any access request appears on the communication channel 40, so that when at time zero the access request appears on the communication channel, the latency cost is already at a positive value.

Line "b" 210 in contrast shows the type of line observed for processing elements whose process requests data when needed, and the request immediately appears on the communication channel 40. An example of such a processing element may for example be a Direct Memory Access (DMA) controller.

Line "c" 220 illustrates the type of line observed for a processing element whose process requests data ahead of time. Hence, in this example, the request appears on the communication channel 40 at time zero, but until time $t_1$ is reached, there is no positive latency cost, since the process is able to do other useful work. Accordingly, it is only at time $t_1$ where the process actually stalls. In contrast, for the process associated with the line 210, that process stalls at time zero, and for the process associated with line 200, the process stalls even before the request appears at time zero on the communication channel 40.

Accordingly, it can be seen that the processes associated with lines 200 and 210 have no slack time, but the process associated with line 220 has some slack time during which a message issued by that process onto the communication channel 40 can be handled without that process stalling.

Figure 3B:
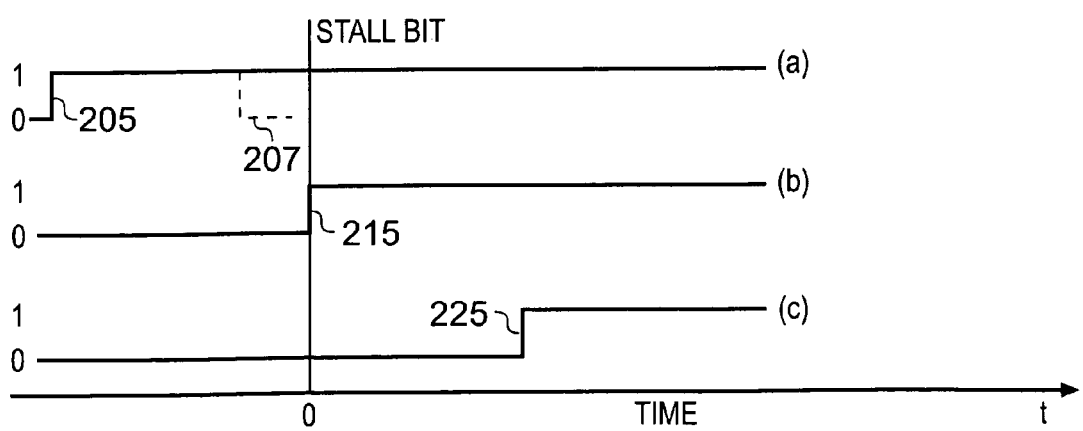
FIG. 3B is a chart illustrating the values of stall bits issued in accordance with one example embodiment for the three different processes illustrated in FIG. 3A.

In accordance with one embodiment, part of the progress information issued by any master device executing a non real time process is a stall bit which is set when the process is stalled and is reset when the process is not stalled. FIG. 3B illustrates the profile of this stall bit for the three example lines of FIG. 3A. In this example, it is assumed that the set condition is indicated by a logic one value and the reset condition is indicated by a logic zero value. As can be seen from FIG. 3B, the process associated with line a will stall at point 205, and accordingly the stall bit will be set at that point. Similarly the process associated with line b will stall at point 215 and the process associated with line c will stall at point 225, and accordingly the stall bit will transition at points 215, 225, respectively.

Considering the process associated with line a, it is possible that the request may be serviced internally within the processing element without any need for the request ever to be issued on the communication channel 40. For example, considering the earlier-mentioned processor with cache example, if a cache hit occurs, then the access will proceed with respect to the cache, without any need for the access request to be propagated over the communication channel 40. Accordingly, as indicated by the dotted line 207, in such situations the stall bit would transition to a logic one value at 205, but would then transition back to the logic zero level once the access request has been serviced. In one embodiment, irrespective of whether any particular access request is ever issued onto the communication channel 40, the stall bit is still output as part of the progress information, and indeed in one embodiment is used as in input to a filter used to generate latency information for that process. This hence provides the arbitration control circuitry 80 with information about the proportion of time any particular master device's process is stalled irrespective of the cause of that stall, and in particular not limited only to situations where the stall occurs as the result of latency introduced via the communication channel 40.

Figure 4:
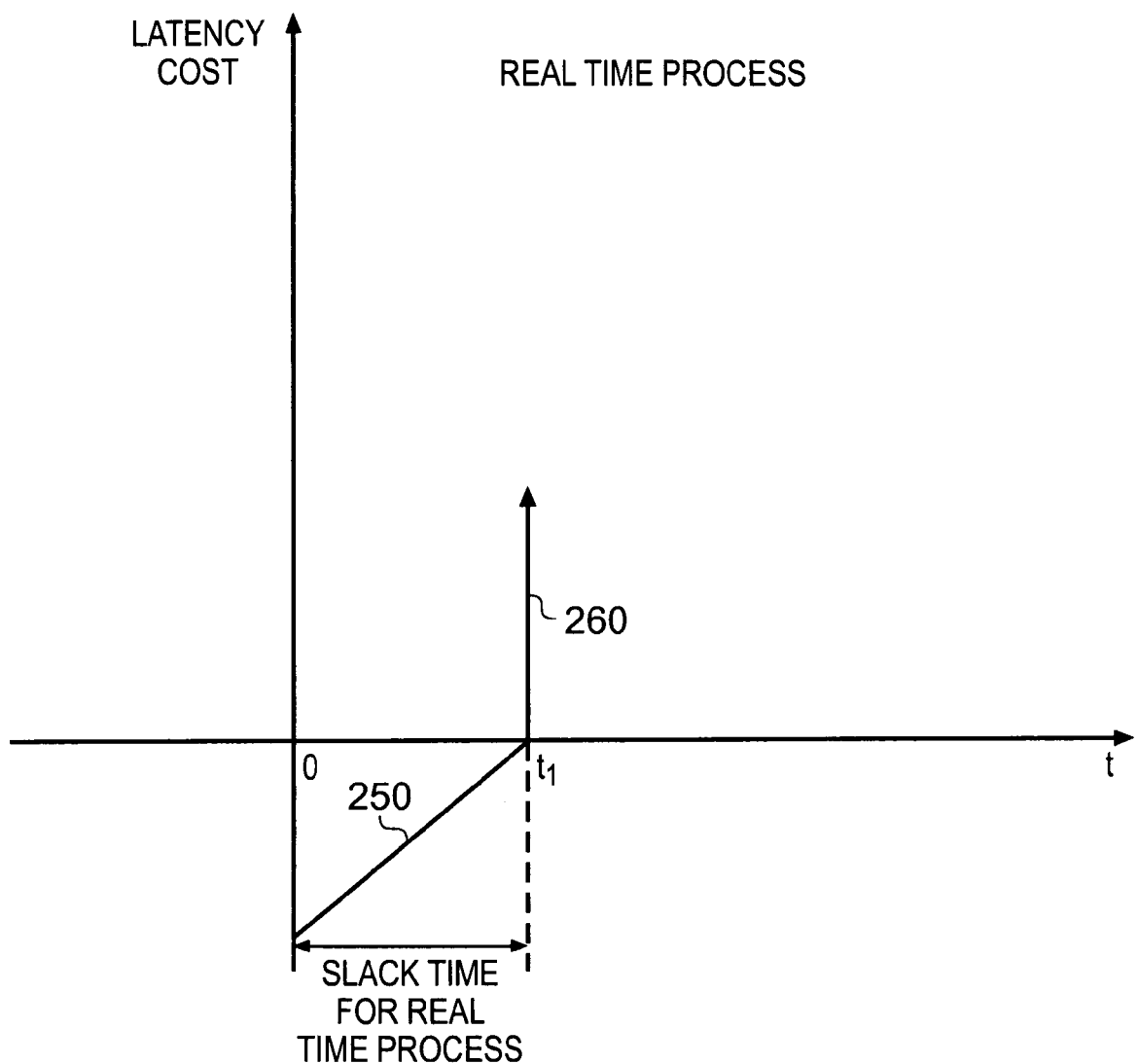
FIG. 4 is a chart illustrating the latency cost against time for a real time process.

FIG. 4 is a similar diagram to FIG. 3A, but illustrates the latency cost of a real time process. As discussed earlier, for the purposes of the present application, a real time process is a process where it is unacceptable for that process to stall, as contrasted with a non real time process where some stalling of the process is acceptable. Accordingly, given that a real time process is not allowed to stall, a real time process will typically request data ahead of time, and accordingly whilst the curve is following path 250, there is slack time associated with that real time process. However, in this instance, the slack time indicates the time remaining for handling a message issued by that real time process, and if the slack time is exhausted the latency cost then becomes infinite as indicated by the vertical line 260.

Figure 5:
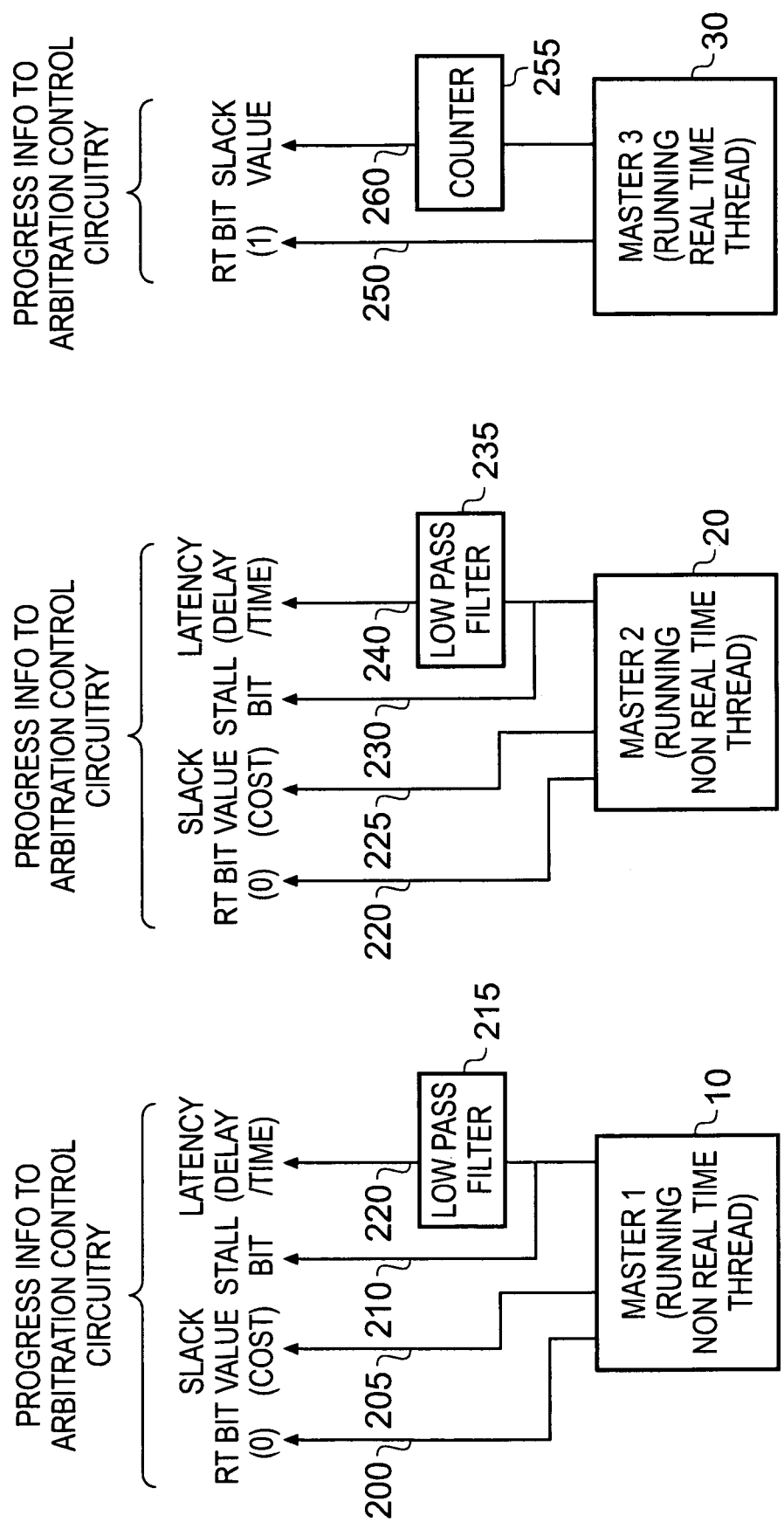
FIG. 5 illustrates the various components of the progress information issued by each master device to the arbitration control circuitry of FIG. 1 in accordance with one example embodiment.

FIG. 5 illustrates the various components of the progress information issued by the master devices 10, 20, 30 in accordance with one embodiment. In particular, in the example of FIG. 5, it is assumed that master 10 is running a non real time thread, master 20 is running a non real time thread, but master 30 is running a real time thread. In one embodiment, each master device running a non real time thread is arranged to issue four components to form the progress information. In particular, a real time bit signal is issued over paths 200, 220 identifying that the process is a non real time thread. In this example, this is illustrated by setting the real time bit to zero. Further, a slack value is output over paths 205, 225 identifying any slack time associated with the non real time thread. With regards to the latency cost graph of FIG. 3A, it will be appreciated that this slack value can be represented by any negative latency cost value. In particular, considering the line c 220, it can be seen that the magnitude of the negative latency cost starts at a particular value at time zero and then progressively decreases to zero during the slack time associated with that process, such that it reaches a value of zero at time $t_1$.

Further, in the embodiment illustrated in FIG. 5, the stall bit is output over the paths 210, 230 identifying whether the associated process is stalled or not at the current time. This stall bit is also input to a low pass filter 215, 235 to cause a latency value to be generated and output over paths 220, 240, this latency value representing delay per unit time. In one embodiment, each low pass filter 215, 235 is a simple, single pole, low-pass filter that tracks the accumulated stall time. In particular, in one embodiment the low pass filter can implement the following equation in order to generate the latency value y:

$$Y_k = \alpha \cdot y_{k-1} + x_k(1-\alpha)$$

where y is the latency value, $\alpha$ is a selected constant, k is a point in time and x is the stall bit value.

Accordingly, the latency value y is proportional to the average stall rate, i.e. the number of cycles during which the thread is stalled over a reference period, where that reference period is dependent on the choice of the constant $\alpha$.

For a real time thread, the progress information again includes a real time bit output over path 250, in this case the real time bit being set to a logic one value to indicate that the thread is a real time thread, and further includes a slack value output over path 260 from a counter 255. In particular, when the real time thread outputs an access request, the counter 255 will be set to some predetermined value representative of the number of clock cycles allowed for responding to that access request, and then on the elapse of each clock cycle, the counter will be decremented, thereby causing the slack value to be reduced over time.

Figure 6:
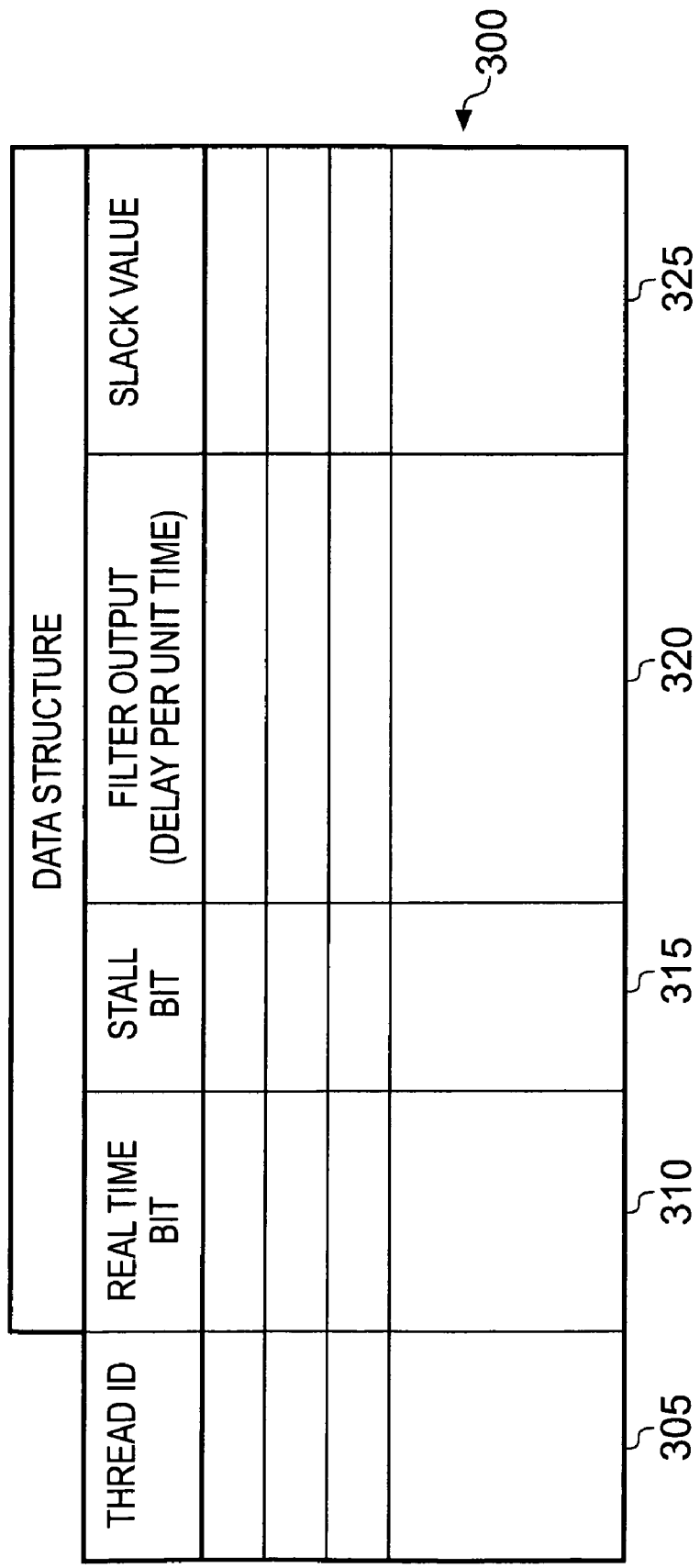
FIG. 6 illustrates a data structure that can be maintained within the arbitration control circuitry of FIG. 1 in accordance with one example embodiment.

Based on the various progress information illustrated in FIG. 5, the arbitration control circuitry 80 of one embodiment then maintains a table 300 of data structures for each thread, as illustrated in FIG. 6. For each thread indicated by a thread ID entered in the field 305, the values of the real time bit, stall bit, filter output and slack value are stored in the fields 310, 315, 320, 325, respectively. If for a particular thread only a subset of the information is provided, then one or more of the fields will be left blank. For example, considering a real time thread, there will be no stall bit or filter output.

The arbitration control circuitry 80 then employs priority ordering circuitry 84 to generate a priority ordered list of processes (threads) taking account of the data structures associated with each thread. It will be appreciated by those skilled in the art that there are a number of known techniques for forming ordered lists when presented with a series of data structures, and often these processes involve iteratively performing a comparison process for selected pairs of data structures. One such mechanism is the well-known "bubble sort" mechanism, which works by repeatedly stepping through the list to be sorted, comparing two data structures at a time and swapping them if they are in the wrong order. The pass through the list is repeated until no swaps are needed, which means the list is sorted.

Figure 7:
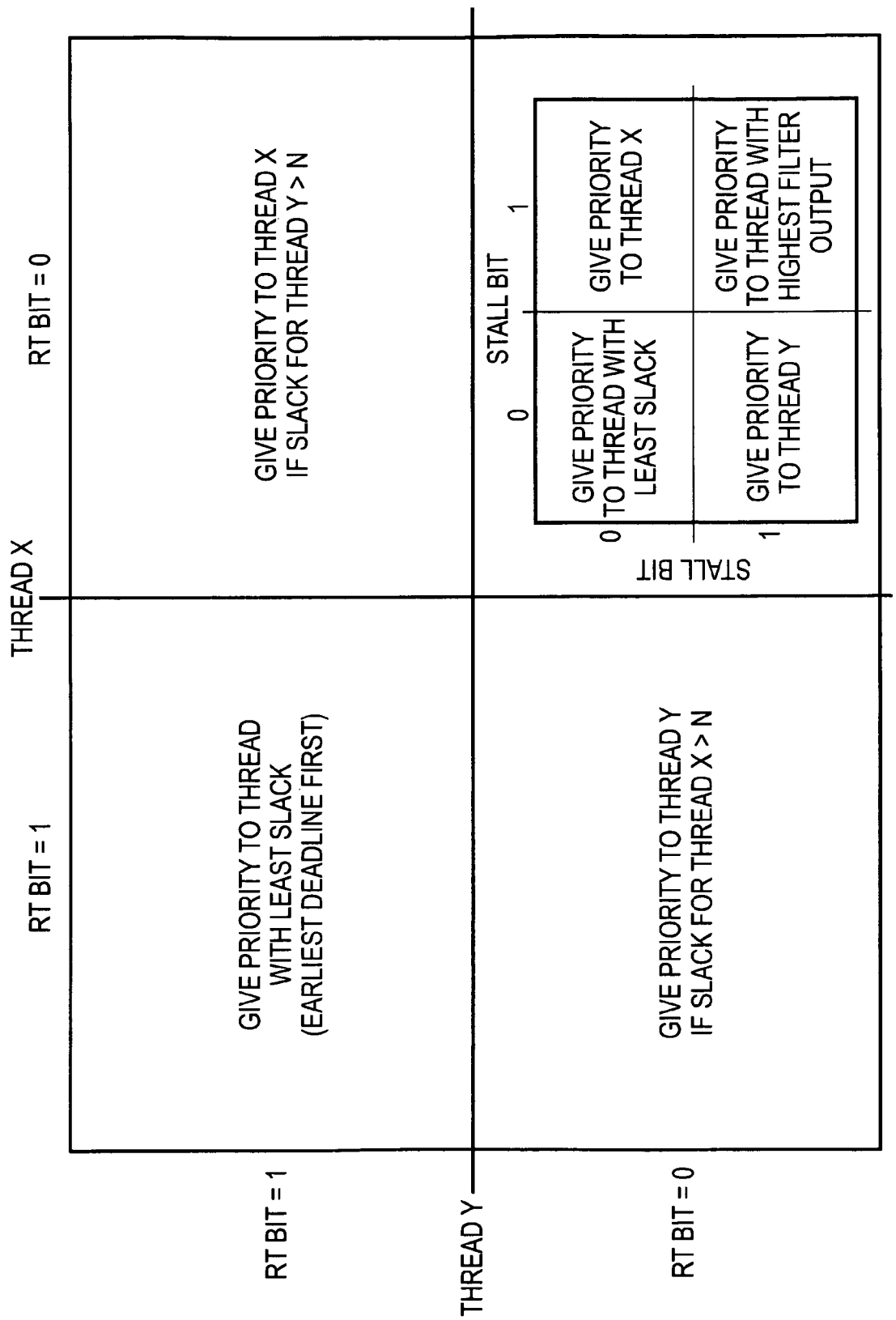
FIG. 7 schematically illustrates the ordering process applied by the arbitration control circuitry of FIG. 1 in respect of two threads in accordance with one example embodiment.

FIG. 7 schematically illustrates how the data structures of a selected pair of threads (here labelled threads X and Y) are compared in order to decide which thread has priority over the other. Accordingly, as shown in FIG. 7, if for both threads the real time bit is set (i.e. both threads are real time threads), then priority is given to the thread with the least slack, i.e. priority is given to the thread having the earliest deadline, such a prioritisation technique often being referred to as "earliest deadline first" prioritisation. If however thread X is a non real time thread and thread Y is a real time thread, then as indicated by the upper right corner of FIG. 7 priority is given to thread X if the slack time for thread Y is greater than a predetermined value N. Accordingly, it will be seen that priority is not automatically given to the real time thread, and instead if the slack time for the real time thread is relatively large, then priority will be given to the non real time thread in order to seek to reduce the latency of that non real time thread. This has no adverse effect on the real time thread, since provided the real time thread is serviced before the slack time expires, no adverse consequence occurs.

Similarly, if thread Y is a non real time thread and thread X is a real time thread, then as indicated by the lower left hand side of FIG. 7, priority is given to thread Y if the slack time for thread X is greater than a predetermined value N.

If both threads are non real time threads, then the decision process is as indicated by the lower right hand side of FIG. 7. In particular the stall bit for both real time threads is first considered. If the stall bit for both threads is zero, indicating that neither thread is stalled, then priority is given to the thread with the least slack, i.e. to the thread that will stall most quickly. If one thread has its stall bit set and the other one does not, then priority is given to the thread whose stall bit is set, i.e. priority is given to the thread that is already stalled. Finally, if both threads have their stall bits set, then priority is given to the thread with the highest filter output, i.e. the thread that has the higher average stall rate over the reference period.

In some embodiments, it will not be necessary for all of the items of progress information discussed earlier with reference to FIG. 5 to be present. For example, in some embodiments slack values may not be available for non real time threads. In that instance, if two non real time threads are being considered and both non real time threads have their stall bit set equal to zero, then priority is given to the thread with the highest filter output, i.e. the same prioritisation is applied as would be applied if both threads had their stall bit set equal to one.

If in one embodiment, certain threads do not provide a stall bit, then it is assumed that that stall bit is set, i.e. has a logic one value.

Figure 8:
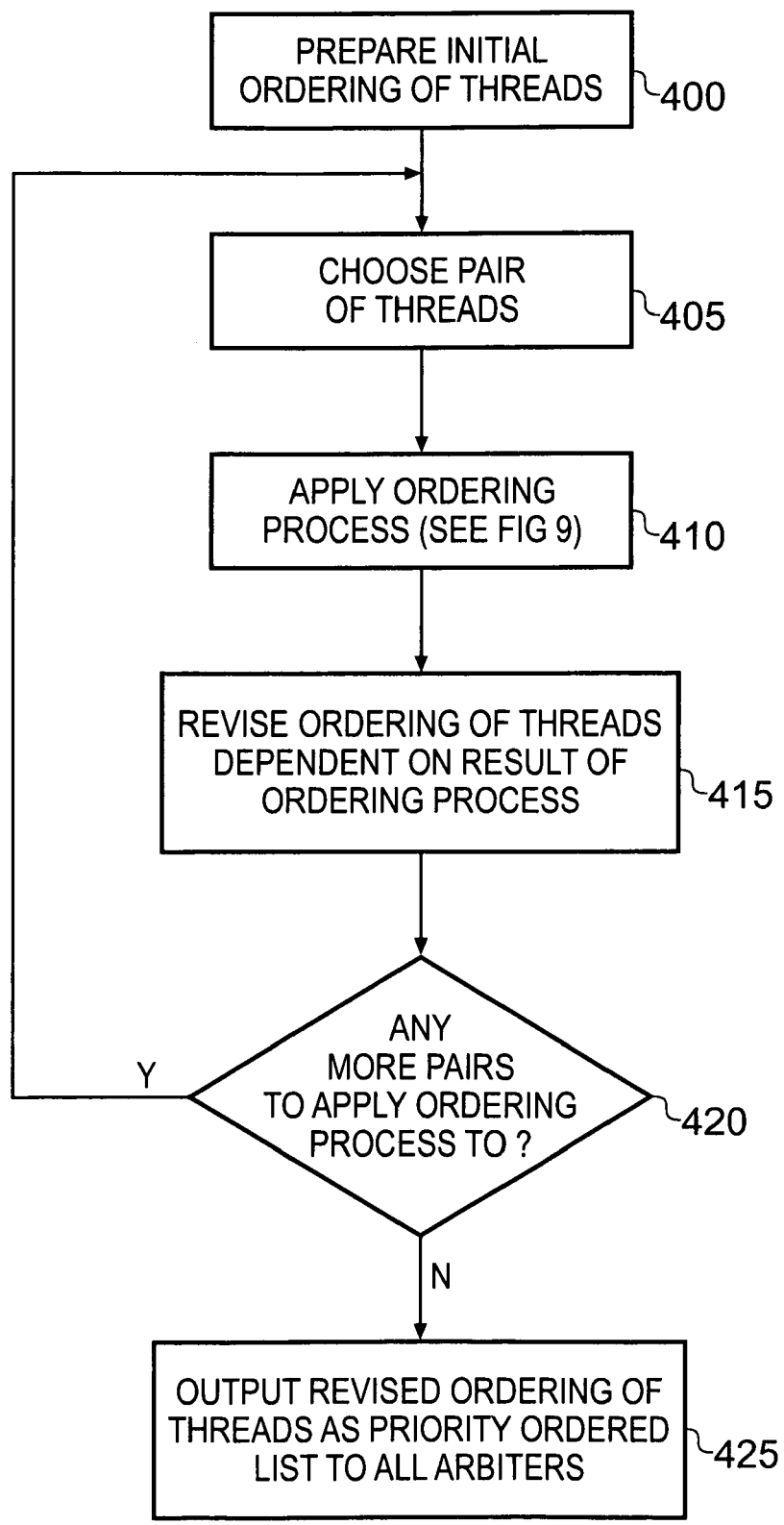
FIG. 8 is a flow diagram illustrating the priority ordering process applied by the arbitration control circuitry of FIG. 1 in accordance with one example embodiment.

FIG. 8 illustrates the general process performed by the arbitration control circuitry 80 of FIG. 1 in accordance with one embodiment in order to produce a priority ordered list. At step 400, an initial ordering of the threads is prepared. On a first iteration, this can be an arbitrary ordering, but for subsequent iterations it is likely that the initial ordering will be the previous ordering produced by the process. Thereafter, the process proceeds to step 405, where a pair of threads is selected, whereafter at step 410 an ordering process is applied as will be described in more detail later with reference to FIG. 9. This ordering process implements the prioritisation scheme schematically illustrated earlier with reference to FIG. 7.

Thereafter, at step 415, the ordering of the threads is revised dependent on the result of the ordering process, whereafter at step 420 it is determined whether there are any more pairs of threads to which the ordering process should be applied. On a first iteration through the process, it would typically be the case that every combination of pairs of threads will need to be subjected to the ordering process. However, on subsequent iterations, depending on what features of the progress information have altered, and which threads' progress information has altered, it may only be necessary to apply the ordering process to a subset of all possible pairs of threads. If at step 420 it is decided that there is at least one more pair of threads to which the ordering process needs to be applied, then the process returns to step 405, whereas if it is decided that there are no more pairs to be subjected to the ordering process, then the process proceeds to step 425, where a revised ordering of threads is output as the priority ordered list to all arbiters within the communication channel 40.

It should be noted that whilst for the purposes of illustration steps 405, 410, 415 and 420 are shown sequentially, these steps can actually be performed in parallel, such that all pairs that need to be subjected to the ordering process are identified, and then the ordering process is applied in parallel in order to produce the revised ordering of threads.

Figure 9:
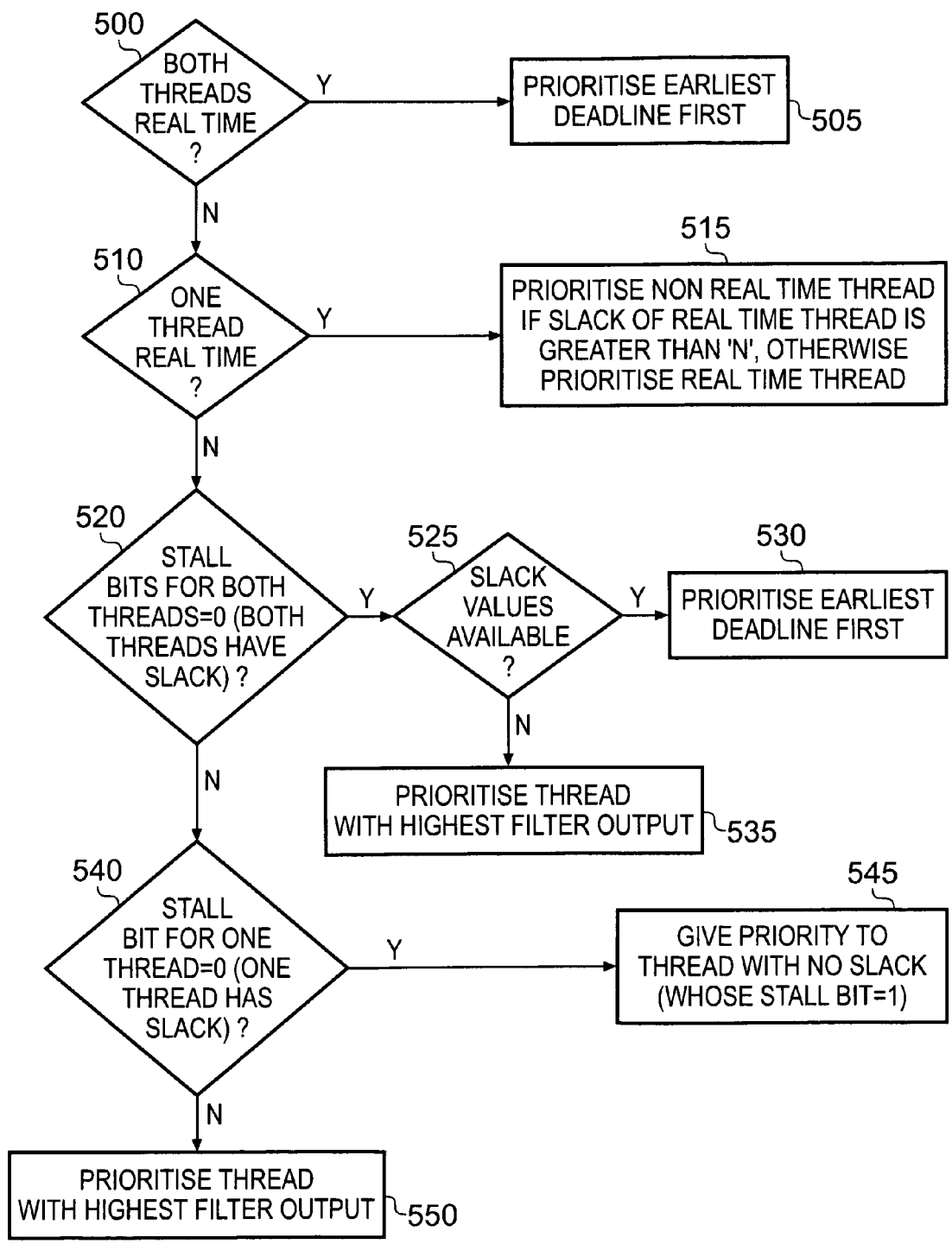
FIG. 9 is a flow diagram illustrating in more detail the steps performed to apply the ordering process to a selected pair of threads in accordance with one example embodiment.

FIG. 9 is a flow diagram illustrating the steps performed at step 410 of FIG. 8 in accordance with one example embodiment. At step 500, it is determined whether both threads are real time threads, and if so the threads are prioritised according to the earliest deadline first principle at step 505.

If it is determined at step 500 that both threads are not real time, then it is determined at step 510 whether one of the threads is a real time thread, and if so the process proceeds to step 515 where priority is given to the non real time thread if the slack of the real time thread is greater than a predetermined value N. Otherwise, the real time thread is prioritised.

If it is determined at step 510 that neither thread is a real time thread, then the process proceeds to step 520 where it is determined whether the stall bits of both threads are equal to zero, i.e. whether both threads still have some slack remaining. Assuming both threads do still have some slack, then the process proceeds to step 525 where it is determined whether slack values are available, and if so the process proceeds to step 530 where the threads are prioritised according to the earliest deadline first principle, i.e. priority is given to the thread with the least slack. However, if at step 525 it is determined that slack values are not available, then the process proceeds to step 535 where priority is given to the thread with the highest filter output.

If at step 520 it is determined that the stall bit for both threads is not equal to zero, then it is determined at step 540 whether the stall bit for one of the threads is equal to zero, i.e. one thread has slack. If so, the process proceeds to step 545 where priority is given to the thread with no slack (i.e. the thread whose stall bit is equal to one).

If at step 540 it is determined that neither stall bit is set to zero, i.e. both threads are stalled, then the process proceeds to step 550, where priority is given to the thread with the highest filter output.

From the above description of FIG. 9, it will be seen that the process of FIG. 9 implements the selection criteria schematically illustrated in FIG. 7.

In one embodiment, certain non real time threads can be treated preferentially over other non real time threads by attributing different weightings to those threads. In practice, these weightings can be applied by the associated low-pass filter 215, 235 provided for each processing element executing a non real time thread. As a result, for a process with a higher weighting, then each time the stall bit is set, the output latency value from the associated low-pass filter will increase by a larger amount than would be the case for a lower weighted process. Accordingly, if when applying the selection criteria illustrated schematically with reference to FIG. 7, it is determined that priority should be given to the thread with the highest filter output, then, all things being equal, the thread with the higher weighting will have a higher filter output and will be prioritised ahead of a thread with a lower weighting. Hence, by weighting the outputs from the filters, this provides further flexibility for handling the priorities of various non real time threads.

It will be appreciated that the above described techniques of the embodiments seek to reduce the maximum latency applied to the various threads executing on the master devices. This in turn will proportionately increase the number of useful clock cycles where each process can undertake useful work. If as a result this provides better performance than is actually required, then there is the opportunity to increase the total latency by reducing the operating performance level of the master devices, or of the communication channel shared by those master devices.

In particular, a number of modern day systems provide energy management techniques that can vary the performance levels of certain components within the system, typically by altering the frequency and/or operating voltage of those components. Typically, such performance level setting is performed by an energy management controller within the system.

Figure 10:
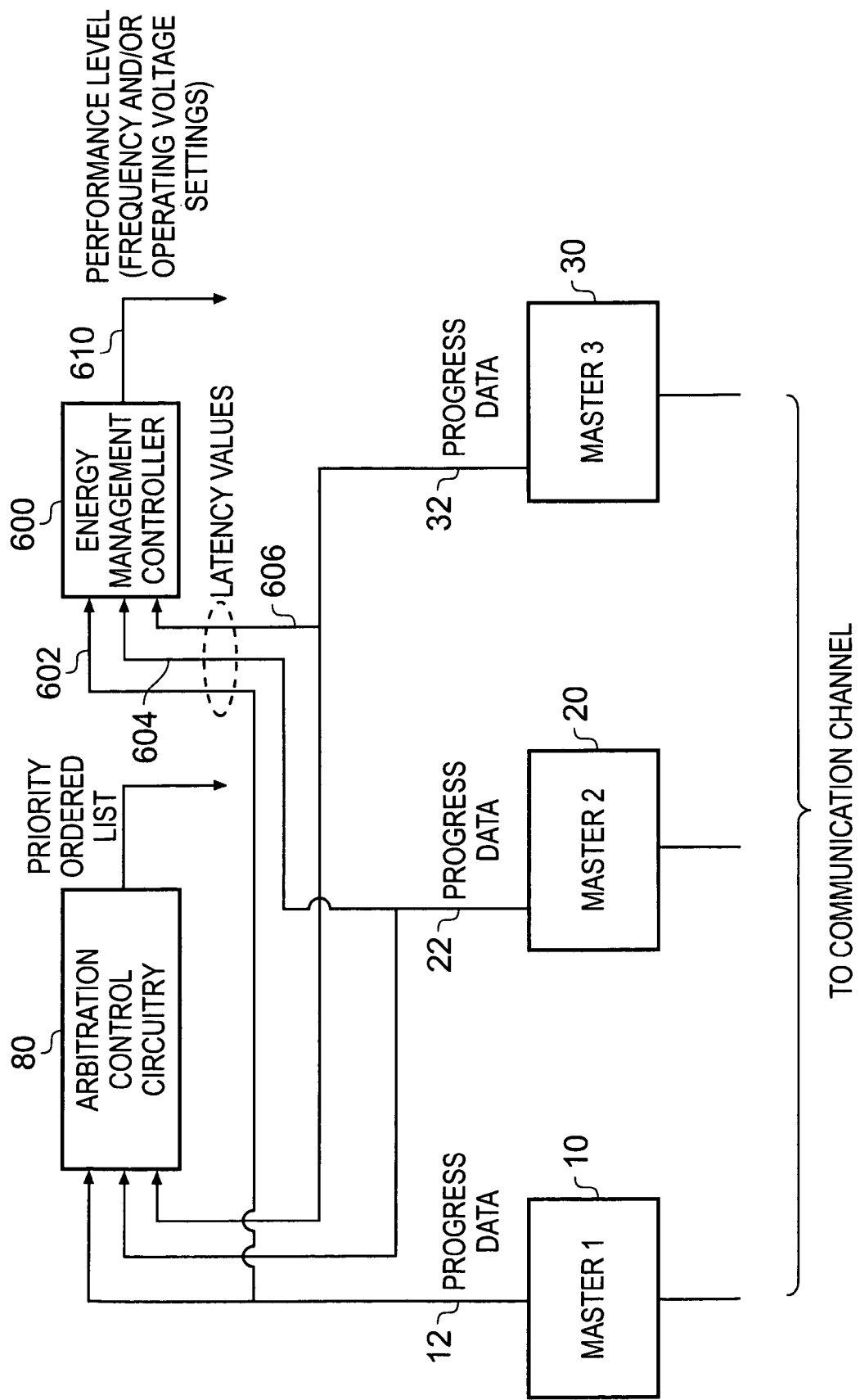
FIG. 10 is a block diagram illustrating how at least part of the progress data issued by the various master devices of FIG. 1 may also be routed to energy management control circuitry within the data processing apparatus in accordance with one example embodiment.

Given the above observations, in one embodiment, certain aspects of the progress data output by the various master devices are also routed as input to such an energy management controller. FIG. 10 schematically illustrates such an embodiment, and as can be seen from FIG. 10, certain of the progress data output over paths 12, 22, 32 can also be routed over paths 602, 604, 606, respectively, as inputs to an energy management controller 600. In one particular embodiment, the latency values output by any non real time threads are routed to the energy management controller 600. This information can be used in a variety of ways.

If for example the operating frequency of a particular master device is a thousand cycles per millisecond, and the latency value indicates that there are a hundred stall cycles per millisecond, then this means that the master device has nine hundred useful cycles per millisecond. If in fact that master device only needs six hundred useful cycles per millisecond in order to execute its process in a satisfactory manner, then the frequency and/or operating voltage supplied to that master device can be reduced in order to save energy whilst still providing the six hundred useful cycles per millisecond required by that master device. Depending on the granularity with which the performance levels can be varied, this process may be performed separately in turn for each master device.

Alternatively, or in addition, if the performance level of the communication channel 40 can be varied by the energy management controller, then the energy management controller 600 can select the highest latency value received from the various master devices and adjust the performance level of the communication channel having regards to that highest value. This may for example enable the operating frequency of the communication channel to be reduced whilst still ensuring that the processes executing on the various master devices can continue to operate satisfactorily. Essentially, the energy management controller can adjust the clock speed of the communication channel in order to aim for a reference thread stall rate that is acceptable to the system and the applications running thereon.

The above described embodiments enable a QoS to be determined and allocated automatically between threads, removing the need to know the requirements in advance, with the QoS adapting dynamically to changes in the communication between the threads.

The QoS scheme of embodiments can also be used to provide a reference performance level for a communication channel implementation. In particular, it allows comparisons to be made in the architecture of components such as memory controllers where the cost of adding a pipelining stage to implement an arbitration scheme of this type can be compared against the cost of the additional cycle of latency to all threads accessing the memory controller.

Although particular example embodiments have been described herein, it will be appreciated that the technology disclosed herein is not limited thereto and that many modifications and additions thereto may be made.

I claim:

1. A data processing apparatus for arbitrating between messages routed over a communication channel, comprising:
a plurality of processing elements, each processing element for executing a process requiring messages to be issued to recipient elements;
a communication channel shared amongst the plurality of processing elements over which the messages are routed;
arbitration circuitry for performing an arbitration process to arbitrate between multiple messages routed over the communication channel;
each processing element being arranged to issue progress data for the process executing on that processing element, the progress data indicating latency implications for the process, wherein the process executed by at least one of said plurality of processing elements is a non-real time process, and the progress data for that process additionally identifies at least a latency value indicating average latency associated with that process over a predetermined time; and
arbitration control circuitry, responsive to the progress data from each processing element, to perform a priority ordering process taking into account the latency implications of each process as indicated by the progress data in order to generate priority ordering data, and to output the priority ordering data to the arbitration circuitry in order to control the arbitration process.

2. A data processing apparatus as claimed in claim 1, wherein each processing element is a master device connected to the communication channel.

3. A data processing apparatus as claimed in claim 2, wherein each message is an access request issued by one of said master devices.

4. A data processing apparatus as claimed in claim 1, wherein each process is a program thread, and each processing element executes a single program thread.

5. A data processing apparatus as claimed in claim 1, wherein at least one processing element comprises multiple processing units, each processing unit executing a program thread.

6. A data processing apparatus as claimed in claim 1, wherein the data processing apparatus is a system-on-chip.

7. A data processing apparatus as claimed in claim 1, wherein the process executed by at least one other of said plurality of processing elements is a real time process, wherein the progress data identifies whether the associated process is a real time process or a non real time process, and wherein for a real time process, the progress data additionally identifies at least a slack value indicating a time remaining for handling of a message issued by that real time process.

8. A data processing apparatus as claimed in claim 7, further comprising filter circuitry associated with said at least one processing element executing a non real time process, the filter circuitry producing said at least one latency value in the form of latency per unit time.

9. A data processing apparatus as claimed in claim 7, wherein said at least one non real time process has a weighting associated therewith and that weighting is taken into account when producing the latency value for that non real time process.

10. A data processing apparatus as claimed in claim 7, further comprising counter circuitry associated with said at least one other processing element executing a real time process, the counter circuitry producing said slack value.

11. A data processing apparatus as claimed in claim 7, wherein for a non real time process the progress data additionally identifies a stall value identifying whether that process is stalled or not.

12. A data processing apparatus as claimed in claim 7, wherein for a non real time process the progress data additionally identifies a slack value indicating a time remaining for handling of a message issued by that process before the process will stall.

13. A data processing apparatus as claimed in claim 7, wherein the priority ordering process gives priority to a non real time process over a real time process if the slack value of that real time process indicates that the time remaining for handling of a message issued by that real time process is larger than a predetermined threshold.

14. A data processing apparatus as claimed in claim 7, wherein the priority ordering process gives priority to a non real time process with a higher latency value over a non real time process with a lower latency value.

15. A data processing apparatus as claimed in claim 14, wherein for a non real time process the progress data additionally identifies a stall value identifying whether that process is stalled or not, wherein for two non real time processes having different stall values, the priority ordering process gives priority to the non real time process whose stall value indicates that that process is stalled in preference to giving priority to the process with the higher latency value.

16. A data processing apparatus as claimed in claim 14, wherein for a non real time process the progress data additionally identifies a slack value indicating a time remaining for handling of a message issued by that process before the process will stall, wherein for two non real time processes having different slack values, the priority ordering process gives priority to the non real time process with the least slack in preference to giving priority to the process with the higher latency value.

17. A data processing apparatus as claimed in claim 1, further comprising:

energy management circuitry for controlling an operating performance level of one or more processing elements of said plurality of processing elements, the energy management circuitry being operable to take into account at least part of the progress data issued by those one or more processing elements when determining the operating performance level.

18. A data processing apparatus as claimed in claim 17, wherein the process executed by at least one other of said plurality of processing elements is a real time process, wherein the progress data identifies whether the associated process is a real time process or a non real time process, wherein for a real time process, the progress data additionally identifies at least a slack value indicating a time remaining for handling of a message issued by that real time process, and wherein said at least part of the progress data comprises the latency values output by one or more processing elements executing a non real time process.

19. A method of arbitrating between messages routed over a communication channel of a data processing apparatus having a plurality of processing elements, each processing element executing a process requiring messages to be issued to recipient elements, and the communication channel being shared amongst the plurality of processing elements over which the messages are routed, the method comprising:

issuing from each processing element progress data for the process executing on that processing element, the progress data indicating latency implications for the process, wherein the process executed by at least one of said plurality of processing elements is a non-real time process, and the progress data for that process additionally identifies at least a latency value indicating average latency associated with that process over a predetermined time;

responsive to the progress data from each processing element, performing a priority ordering process taking into account the latency implications of each process as indicated by the progress data in order to generate priority ordering data; and performing an arbitration process to arbitrate between multiple messages routed over the communication channel, the priority ordering data being used to control the arbitration process.

20. Arbitration control circuitry for a data processing apparatus, the data processing apparatus having a plurality of processing elements, each processing element executing a process requiring messages to be issued to recipient elements, a communication channel shared amongst the plurality of processing elements over which the messages are routed, and arbitration circuitry for performing an arbitration process to arbitrate between multiple messages routed over the communication channel, the arbitration circuitry comprising:

an input interface for receiving from each processing element progress data for the process executing on that processing element, the progress data indicating latency implications for the process, wherein the process executed by at least one of said plurality of processing elements is a non-real time process, and the progress data for that process additionally identifies at least a latency value indicating average latency associated with that process over a predetermined time;

priority ordering circuitry, responsive to the progress data from each processing element, to perform a priority ordering process taking into account the latency implications of each process as indicated by the progress data in order to generate priority ordering data; and an output interface for outputting the priority ordering data to the arbitration circuitry in order to control the arbitration process.

* * * * *